(12) United States Patent
Okada

(10) Patent No.: US 8,182,941 B2
(45) Date of Patent: May 22, 2012

(54) ALKALINE DRY BATTERY AND METHOD FOR PRODUCING THE SAME

(75) Inventor: Tadaya Okada, Osaka (JP)

(73) Assignee: Panasonic Corporation, Osaka (JP)

( * ) Notice: Subject to any disclaimer, the term of this patent is extended or adjusted under 35 U.S.C. 154(b) by 695 days.

(21) Appl. No.: 12/349,222

(22) Filed: Jan. 6, 2009

(65) Prior Publication Data

US 2009/0253040 A1    Oct. 8, 2009

(30) Foreign Application Priority Data

Apr. 8, 2008   (JP) ................................ 2008-100647

(51) Int. Cl.
 *H01M 4/50*   (2010.01)
 *H01M 4/62*   (2006.01)
(52) U.S. Cl. ........................ 429/224; 429/232; 29/623.2
(58) Field of Classification Search .................. 429/224, 429/232; 29/623.1, 623.2
See application file for complete search history.

(56) References Cited

U.S. PATENT DOCUMENTS

| | | | |
|---|---|---|---|
| 5,290,509 A * | 3/1994 | Furukawa et al. | ........ 429/224 X |
| 7,569,306 B2 * | 8/2009 | Kato et al. | ..................... 429/223 |
| 2004/0157115 A1 | 8/2004 | Bouffard et al. | |
| 2008/0026285 A1* | 1/2008 | Sawada et al. | ............ 429/224 X |
| 2009/0263720 A1* | 10/2009 | Nunome et al. | ............... 429/224 |

FOREIGN PATENT DOCUMENTS

| | | |
|---|---|---|
| JP | 04-206149 | 7/1992 |
| JP | 07-263000 | 10/1995 |
| JP | 09-180708 | 7/1997 |
| JP | 10-144304 | 5/1998 |
| JP | 10-284067 | 10/1998 |
| JP | 2006-012493 | 1/2006 |
| JP | 2008-502120 | 1/2008 |

OTHER PUBLICATIONS

Japanese Office Action issued in Japanese Patent Application No. 2008-100647, dated Oct. 14, 2010.
Extended European Search Report, issued in European Patent Application No. 09 15 0151.0, dated Dec. 23, 2011.

* cited by examiner

*Primary Examiner* — Stephen J. Kalafut
(74) *Attorney, Agent, or Firm* — McDermott Will & Emery LLP

(57) ABSTRACT

An alkaline dry battery of this invention includes: a cylindrical battery case with a bottom; a cylindrical positive electrode having a hollow, being in contact with an inner face of the battery case, and containing a manganese dioxide powder and a graphite powder; a negative electrode disposed in the hollow of the positive electrode; a separator interposed between the positive electrode and the negative electrode; and an alkaline electrolyte. The positive electrode has cracks therein, and the cracks are substantially arc-shaped in a cross-section perpendicular to the axial direction of the positive electrode and extend in the axial direction of the positive electrode. The positive electrode has a manganese dioxide density of 2.15 to 2.30 g/cm$^3$.

7 Claims, 3 Drawing Sheets

F I G. 2
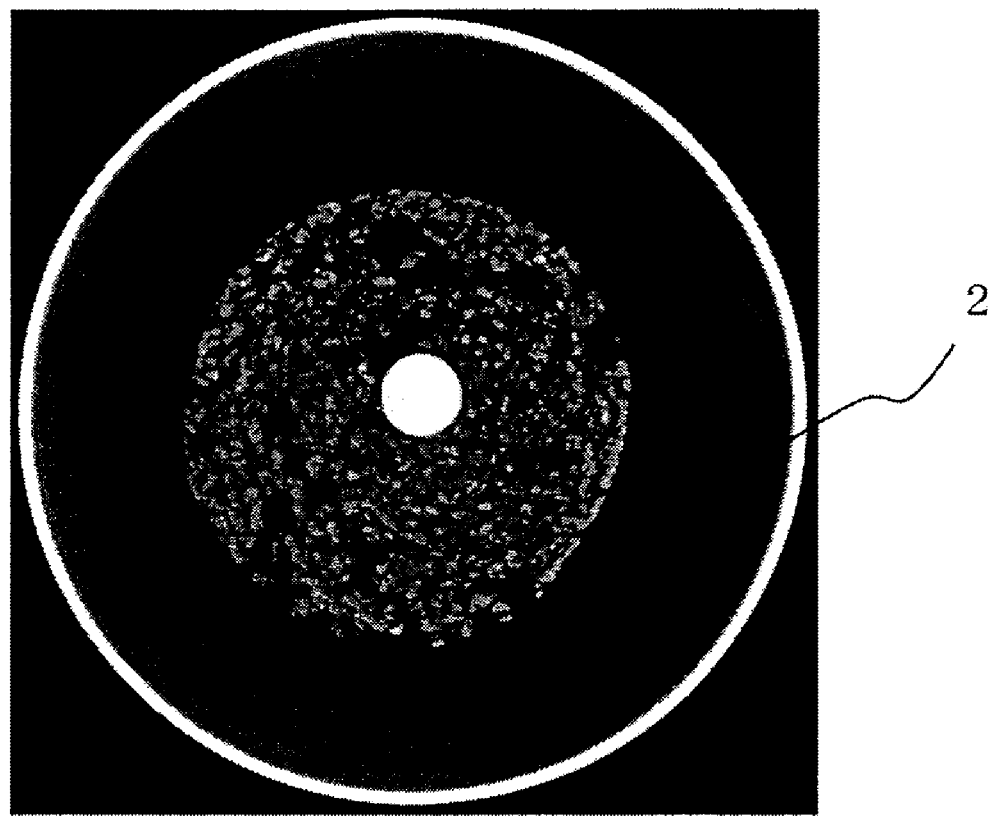

ALKALINE DRY BATTERY AND METHOD FOR PRODUCING THE SAME

FIELD OF THE INVENTION

The invention relates to an alkaline dry battery and a method for producing the same, and, particularly to a positive electrode used in an alkaline dry battery.

BACKGROUND OF THE INVENTION

Alkaline dry batteries generally have an inside-out structure. That is, a cylindrical positive electrode with a hollow is disposed in a battery case serving as the positive electrode terminal so as to closely adhere to the inner face of the battery case, and a negative electrode is disposed in the hollow with a separator interposed therebetween. Manganese dioxide powder is used as the positive electrode active material. Natural manganese dioxide (NMD), chemical manganese dioxide (CMD), or industrially produced manganese dioxide such as electrolytic manganese dioxide (EMD) is used as manganese dioxide. Among them, electrolytic manganese dioxide is used advantageously. Electrolytic manganese dioxide usually contains moisture, ash, and other unavoidable components, with the manganese dioxide ($MnO_2$) purity being a little more than 90%.

Recently, alkaline dry batteries have been required to provide higher performance and, at the same time, there is an increasing demand for low-priced products having high cost performance. To meet such requirements, attempts have been made, for example, to decrease the amount of the positive electrode active material and increase the porosity of the positive electrode so as to increase the amount of electrolyte contained in the positive electrode for enhancing reaction efficiency.

For example, Japanese Laid-Open Patent Publication No. Hei 10-144304 proposes an alkaline dry battery using a positive electrode with a core formation density of 2.9 to 3.1 g/cc. This positive electrode is produced by adding a water-soluble binder such as polyacrylic acid to a mixture of manganese dioxide (positive electrode active material) and graphite (conductive material), and the amount of the water-soluble binder is 0.6 to 1.5% by weight of the manganese dioxide.

Also, Japanese Laid-Open Patent Publication No. Hei 09-180708 proposes an alkaline dry battery using a positive electrode pellet containing manganese dioxide and a conductive material. The positive electrode pellet has pores with pore sizes of 3 nm to 400 μm, and the amount of the pores is 0.14 cc/g or more and 0.24 cc/g or less per unit weight.

In Japanese Laid-Open Patent Publication No. Hei 10-144304, a large amount of a binder is used to produce the positive electrode, in order to prevent a decline in the positive electrode strength due to decreased active material and increased pores in the positive electrode. However, since the large binder amount makes the positive electrode mixture adhesive, the positive electrode mixture tends to adhere to the die or tooling when it is compression molded into a positive electrode pellet or positive electrode. It is thus difficult to produce a predetermined positive electrode pellet or positive electrode. Also, the mold release pressure becomes high and the life of the molding machine tends to become short.

Also, in Japanese Laid-Open Patent Publication No. Hei 09-180708, the apparent density of the positive electrode pellet is approximately 2.6 g/cc, so the strength of the positive electrode pellet is very low. Thus, in the production process, i.e., during the transportation of the positive electrode pellet or in the remolding process inside the battery case, the positive electrode pellet tends to collapse, and the positive electrode pellet is difficult to handle.

In order to solve the above-discussed problems with conventional art, an object of the invention is to provide an alkaline dry battery having a low manganese dioxide density in the positive electrode but having excellent discharge performance, and a method for producing such an alkaline dry battery.

BRIEF SUMMARY OF THE INVENTION

The invention relates to an alkaline dry battery including: a cylindrical battery case with a bottom; a cylindrical positive electrode having a hollow, being in contact with an inner face of the battery case, and containing a manganese dioxide powder and a graphite powder; a negative electrode disposed in the hollow of the positive electrode; a separator interposed between the positive electrode and the negative electrode; and an alkaline electrolyte. The positive electrode has cracks therein, and the cracks are substantially arc-shaped in a cross-section perpendicular to the axial direction of the positive electrode and extend in the axial direction of the positive electrode. The positive electrode has a manganese dioxide density of 2.15 to 2.30 $g/cm^3$.

The manganese dioxide powder preferably has a mean particle size (D50) of 45 to 75 μm.

The graphite powder preferably has a mean particle size (D50) of 20 to 50 μm.

The water content in the positive electrode is preferably 10 to 12 parts by weight per 100 parts by weight of the manganese dioxide powder.

The invention also relates to a method for producing an alkaline dry battery, including the steps of:

(1) mixing a manganese dioxide powder, a graphite powder, and an alkaline electrolyte, to form a positive electrode mixture;

(2) compression molding the positive electrode mixture to obtain cylindrical positive electrode pellets each having a hollow and having a manganese dioxide density of 2.4 to 2.5 $g/cm^3$;

(3) inserting the positive electrode pellets into a cylindrical battery case with a bottom, disposing a cylindrical pin which has a diameter smaller than the internal diameter of the positive electrode pellets by 0.2 to 0.5 mm in the hollows of the positive electrode pellets, and applying a pressure of 40 to 130 MPa to the positive electrode pellets per unit cross-sectional area of the positive electrode pellets from above, to obtain a positive electrode having a hollow and closely adhering to the battery case;

(4) disposing a separator in the hollow of the positive electrode, and injecting an alkaline electrolyte into the battery case to cause the positive electrode to have cracks therein that are substantially arc-shaped in a cross-section perpendicular to the axial direction of the positive electrode and extend in the axial direction of the positive electrode, so that the positive electrode has a manganese dioxide density of 2.15 to 2.30 $g/cm^3$;

(5) filling a negative electrode in the hollow of the positive electrode with the separator interposed therebetween; and (6) sealing the battery case with a seal member.

The content of the graphite powder in the positive electrode mixture is preferably 10 to 15 parts by weight per 100 parts by weight of the total of the manganese dioxide powder and the graphite powder.

The alkaline dry battery of the invention has a high positive electrode reaction efficiency and can provide good discharge performance with less active material than conventional amounts. Therefore, the alkaline dry battery can be produced at low costs. Also, according to the production method of the invention, such an alkaline dry battery can be produced easily and reliably.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 2 is a transverse sectional view of the cylindrical alkaline dry battery of FIG. 1;

DETAILED DESCRIPTION OF THE INVENTION

Figure 1:
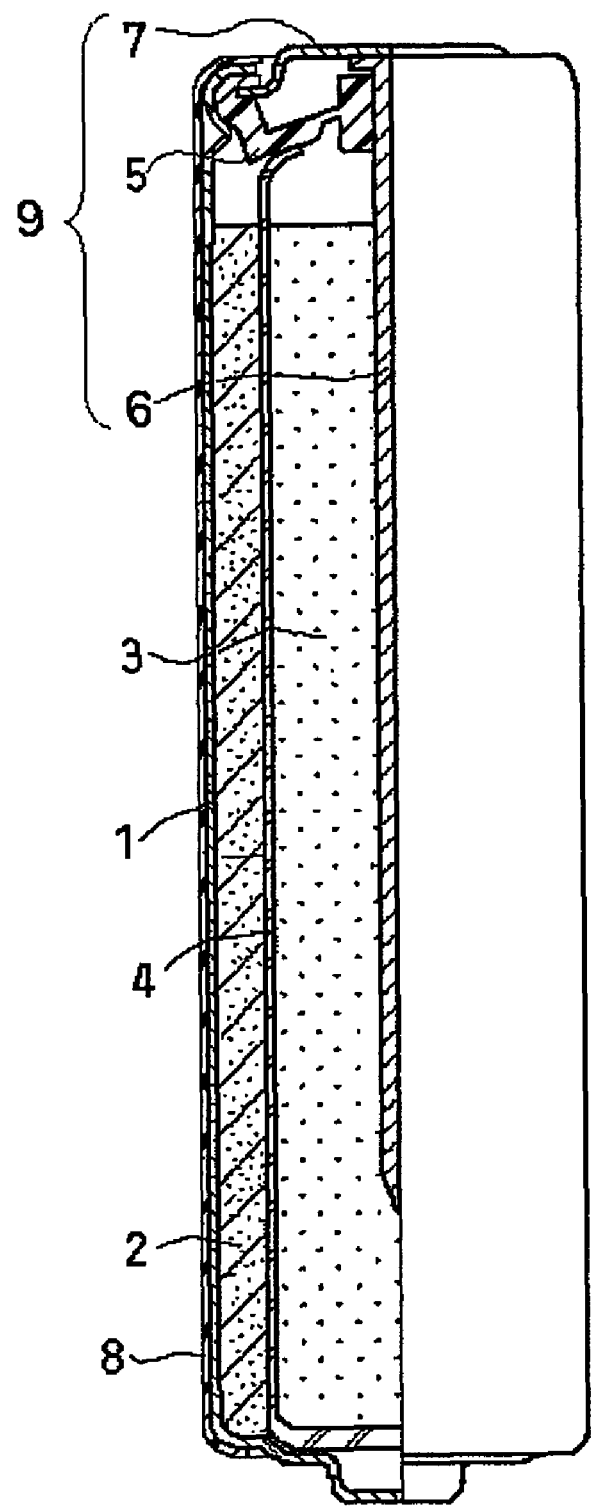
FIG. 1 is a partially sectional front view of a cylindrical alkaline dry battery in one embodiment of the invention.

The invention relates to an alkaline dry battery including: a cylindrical battery case with a bottom; a cylindrical positive electrode having a hollow, being in contact with an inner face of the battery case, and containing a manganese dioxide powder and a graphite powder; a negative electrode disposed in the hollow of the positive electrode; a separator interposed between the positive electrode and the negative electrode; and an alkaline electrolyte. The invention is characterized in that the positive electrode has cracks therein that are substantially arc-shaped in a cross-section perpendicular to the axial direction of the positive electrode and extend in the axial direction of the positive electrode, and that the positive electrode has a manganese dioxide density of 2.15 to 2.30 g/cm$^3$.

In the hollow cylindrical positive electrode of a conventional alkaline dry battery, the reaction efficiency is high on the inner side facing the hollow, i.e., near the separator, and the reaction efficiency lowers toward the outer side of the positive electrode.

In the positive electrode of the invention, cracks are formed in the areas where the reaction efficiency is low. The cracks are substantially arc-shaped in a cross-section perpendicular to the axial direction of the positive electrode, and extend in the axial direction of the positive electrode. In a cross-section perpendicular to the axial direction of the positive electrode, these cracks do not extend around in the positive electrode so that they do not surround the negative electrode. That is, these cracks extend discontinuously in the circumferential direction of the positive electrode in a cross-section perpendicular to the axial direction of the positive electrode. Thus, despite the presence of the void spaces in the positive electrode, the positive electrode has sufficient conductivity. Hence, although the positive electrode has a low manganese dioxide density, excellent discharge performance can be obtained. Therefore, the amount of the active material can be reduced and cost reduction is possible.

Due to the presence of the cracks, the amount of electrolyte contained in the positive electrode increases, which permits an improvement in the reaction efficiency of the positive electrode, i.e., the utilization rate of the positive electrode active material. Also, the manganese dioxide density in the positive electrode is 2.15 to 2.30 g/cm$^3$, which is lower than the manganese dioxide density (approximately 2.5 g/cm$^3$) in conventional positive electrodes. Hence, cost reduction is possible by decreasing the amount of manganese dioxide. In this way, the invention can provide an inexpensive alkaline dry battery with excellent discharge performance.

As used herein, the crack refers to a linear void space whose width is substantially greater than the particle size of the manganese dioxide powder and is less than approximately 0.5 mm in a cross-section perpendicular to the axial direction of the positive electrode.

Also, the manganese dioxide density in the positive electrode is calculated from the positive electrode volume after battery production and the manganese dioxide amount. It should be noted that the amount of impurities contained in the manganese dioxide (electrolytic manganese dioxide) is not reckoned into the amount of the manganese dioxide.

Referring now to FIG. 1, one embodiment of the alkaline dry battery of the invention is described. FIG. 1 is a partially sectional front view of an alkaline dry battery of the invention.

A hollow cylindrical positive electrode 2 is inserted into a cylindrical battery case 1 having a bottom and made of a nickel plated steel plate. The positive electrode 2 comprises, for example, a mixture of manganese dioxide serving as a positive electrode active material, a graphite powder as a conductive material, and an alkaline electrolyte. The battery case 1 has a flat inner face on which a graphite coating film (not shown) is formed.

The hollow of the positive electrode 2 is filled with a gelled negative electrode 3 with a separator 4 interposed therebetween. The negative electrode 3 comprises, for example, a mixture of a gelling agent such as sodium polyacrylate, an alkaline electrolyte, and a negative electrode active material. The negative electrode active material can be, for example, a zinc powder or zinc alloy powder. The zinc alloy contains, for example Bi, In, or Al. The separator can be made of, for example, non-woven fabric composed mainly of polyvinyl alcohol fibers and rayon fibers. The electrolyte can be, for example, an aqueous solution of potassium hydroxide or sodium hydroxide.

The opening of the battery case 1 is sealed with a seal assembly 9. The seal assembly 9 is composed of a synthetic resin gasket 5, a bottom plate 7 serving as the negative electrode terminal, and a negative electrode current collector 6. The negative electrode current collector 6 is inserted into the gelled negative electrode 3. The body of the negative electrode current collector 6 is inserted through the central through-hole of the gasket 5, and the head of the negative electrode current collector 6 is welded to the bottom plate 7. The open edge of the battery case 1 is crimped onto the circumference of the bottom plate 7 with the outer edge of the gasket 5 interposed therebetween. The outer surface of the battery case 1 is covered with a label 8.

FIG. 2 shows a photo of a cross-section of a cylindrical alkaline dry battery (a cross-section perpendicular to the axial direction of the cylindrical alkaline dry battery) as an example of the state of a transverse section of the cylindrical alkaline dry battery of FIG. 1.

As shown in FIG. 2, the positive electrode 2 has cracks therein, and the cracks are substantially arc-shaped in a cross-section perpendicular to the axial direction of the positive electrode 2 and extend in the axial direction of the positive electrode. In a cross-section perpendicular to the axial direction of the positive electrode 2, these cracks do not extend around in the positive electrode so that they do not surround the negative electrode 3. That is, these cracks extend discontinuously in the circumferential direction of the positive electrode 2 in a cross-section perpendicular to the axial direction of the positive electrode. The positive electrode 2 therefore has sufficient conductivity.

In a cross-section perpendicular to the axial direction of the positive electrode 2, the length of a crack (length of a substantial arc) can be, for example, ¼ to ½ of the circumference of the part of the positive electrode having the crack. The length of the crack in the axial direction of the positive electrode 2 can be, for example, 50 to 90% of the height of the positive electrode.

The manganese dioxide density in the positive electrode having the cracks is 2.15 to 2.30 g/cm$^3$. In this way, the positive electrode has a low manganese dioxide density, and the positive electrode has the cracks therein, i.e., areas of low reaction efficiency are replaced with void spaces. Therefore, without causing a significant degradation in discharge performance, the amount of the active material can be reduced and cost reduction is possible.

Since the formation of the cracks is facilitated by swelling of the positive electrode with water, it is preferable that the water content in the positive electrode be 10 to 12 parts by weight per 100 parts by weight of the manganese dioxide. If the water content in the positive electrode is less than 10 parts by weight per 100 parts by weight of the manganese dioxide, the positive electrode does not swell sufficiently, so the cracks are unlikely to be formed. If the water content in the positive electrode exceeds 12 parts by weight per 100 parts by weight of the manganese dioxide, the water content (electrolyte amount) becomes excessive, thereby increasing the possibility of leakage.

The method for producing an alkaline dry battery of the invention includes the steps of:

(1) mixing a manganese dioxide powder, a graphite powder, and an alkaline electrolyte, to form a positive electrode mixture;

(2) compression molding the positive electrode mixture to obtain cylindrical positive electrode pellets each having a hollow and having a manganese dioxide density of 2.4 to 2.5 g/cm$^3$;

(3) inserting the positive electrode pellets into a cylindrical battery case with a bottom, disposing a cylindrical pin which has a diameter smaller than the internal diameter of the positive electrode pellets by 0.2 to 0.5 mm in the hollows of the positive electrode pellets, and applying a pressure of 40 to 130 MPa to the positive electrode pellets per unit cross-sectional area of the positive electrode pellets from above, to obtain a positive electrode having a hollow and closely adhering to the battery case;

(4) disposing a separator in the hollow of the positive electrode, and injecting an alkaline electrolyte into the battery case to cause the positive electrode to have cracks therein that are substantially arc-shaped in a cross-section perpendicular to the axial direction of the positive electrode and extend in the axial direction of the positive electrode, so that the positive electrode has a manganese dioxide density of 2.15 to 2.30 g/cm$^3$;

(5) filling a negative electrode in the hollow of the positive electrode with the separator interposed therebetween; and (6) sealing the battery case with a seal member.

In step (3), the positive electrode pellets are stacked coaxially and inserted into a battery case so that their hollows communicate with one another. Subsequently, a pin is inserted into the hollows of the positive electrode pellets. It should be noted that there is a gap of 0.2 to 0.5 mm between the pin and the positive electrode pellets. Thus, when a pressure is applied to the positive electrode pellets to produce a positive electrode, the positive electrode pellets deform toward the pin so as to close the gap, so that low-density areas are formed therein. The positive electrode prepared in step (3) has a manganese dioxide density of 2.25 to 2.39 g/cm$^3$. When an electrolyte is injected in step (4), the positive electrode swells, so that cracks are formed in the low-density areas.

One embodiment of the method for producing an alkaline dry battery of the invention is hereinafter described.

(A) Step (1)

A manganese dioxide powder serving as a positive electrode active material, a graphite powder as a conductive material, and an alkaline electrolyte are mixed in a predetermined weight ratio. This mixture is evenly stirred and mixed with a mixer or the like, and then shaped into granules of certain granule size, to obtain a granular positive electrode mixture. The mean particle size (D50) (median diameter) of the granular positive electrode mixture is, for example 0.4 to 0.7 mm. The alkaline electrolyte can be, for example, an aqueous solution of potassium hydroxide.

In terms of the strength of the positive electrode and reaction efficiency, it is preferable that the graphite powder content in the positive electrode mixture be 10 to 15 parts by weight per 100 parts by weight of the total of the manganese dioxide powder and the graphite powder.

It is preferable to add not more than 0.35 part by weight of a binder to the positive electrode mixture per 100 parts by weight of the manganese dioxide. If the binder content in the positive electrode mixture exceeds 0.35 part by weight per 100 parts by weight of the manganese dioxide, the strength of the positive electrode mixture becomes too high, so that the cracks are unlikely to be formed.

In step (2) which will be described later, positive electrode pellets having a relatively high manganese dioxide density of 2.40 to 2.50 are produced, and the positive electrode pellets have sufficient strength. Thus, the amount of the binder necessary is smaller than conventional amounts, which is advantageous in terms of costs. With respect to the amount of the binder added to the positive electrode mixture, a less amount is more preferable, and adding no binder to the positive electrode mixture is particularly preferable.

The mean particle size (D50) (median diameter) of the manganese dioxide powder is preferably 45 to 75 μm. When such manganese dioxide is used, the manganese dioxide particles in the positive electrode are not packed too densely, and the electrolyte (water) easily permeates the positive electrode, thereby facilitating the formation of the cracks. The mean particle sizes in this range are relatively larger than conventional ones, and the trouble of pulverization can thus be reduced, which is also advantageous in terms of costs. If the mean particle size (D50) of the manganese dioxide powder is less than 45 μm, it is difficult for the electrolyte (water) to permeate the positive electrode. If the mean particle size (D50) of the manganese dioxide powder is greater than 75 μm, the cracks become too large, and the positive electrode may collapse.

The mean particle size (D50) (median diameter) of the graphite powder is preferably 20 to 50 μm. When such graphite is used, the graphite particles in the positive electrode are not packed too densely, and the electrolyte (water) easily permeates the positive electrode, thereby facilitating the formation of the cracks. The mean particle sizes in this range are relatively larger than conventional ones, and the trouble of pulverization can thus be reduced, which is also advantageous in terms of costs. If the mean particle size (D50) of the graphite powder is less than 20 μm, it is difficult for the electrolyte (water) to permeate the positive electrode. If the mean particle size (D50) of the graphite powder is greater than 50 μm, the cracks become too large, and the positive electrode may collapse.

(B) Step (2)

Figure 3:
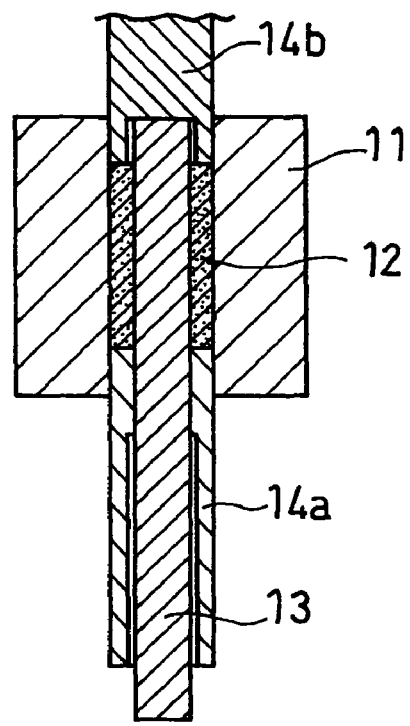
FIG. 3 is a schematic longitudinal sectional view showing an example of step (2) in a production method of an alkaline dry battery according to the invention.

Referring now to FIG. 3, an example of step (2) is described. FIG. 3 is a schematic longitudinal sectional view showing an example of step (2) in the production method of an alkaline dry battery of the invention.

As shown in FIG. 3, using a hollow cylindrical die, the granular positive electrode mixture prepared in step (1) is compression molded in the following manner, to obtain a positive electrode pellet 15.

Specifically, a die 11, a center pin 13, a lower molding punch 14a, and an upper molding punch 14b are prepared. First, the center pin 13 is disposed in the center of the hollow of the die 11 with gaps therebetween. The lower molding punch 14a is then inserted into the gaps, into which a granular electrode mixture 12 is to be charged. At this time, the center pin 13 is passed through the hole of the lower molding punch 14a. Next, while the lower molding punch 14a is moved downward from a predetermined position, the granular electrode mixture 12 is charged into the gaps between the die 11 and the center pin 13. At this time, in order to charge the granular electrode mixture 12 fully, the lower molding punch 14a is moved down to a position slightly lower than the predetermined position and then moved up to the predetermined position. After the granular electrode mixture is charged, the granular electrode mixture 12 is smoothed over with a spatula or the like so as to be flush with the top face of the die 11. Thereafter, the center pin 13 is pushed up so that it fits into the recess at the lower end of the upper molding punch 14b, and then the upper molding punch 14b is pushed down to compression mold the charged granular electrode mixture 12. In this way, the hollow cylindrical positive electrode pellet 15 is produced.

The manganese dioxide density in the positive electrode pellet is 2.4 to 2.5 g/cm$^3$, which is relatively high. The positive electrode pellet thus has sufficient strength. Therefore, the positive electrode pellet does not collapse when the positive electrode pellet is transported to step (3) which will be described later or when it is inserted into the battery case in step (3). By adjusting the pressure applied to mold the positive electrode pellet 15 (pressure applied by the upper molding punch 14b), the manganese dioxide density in the positive electrode pellet 15 can be controlled.

(C) Step (3)

Figure 4:
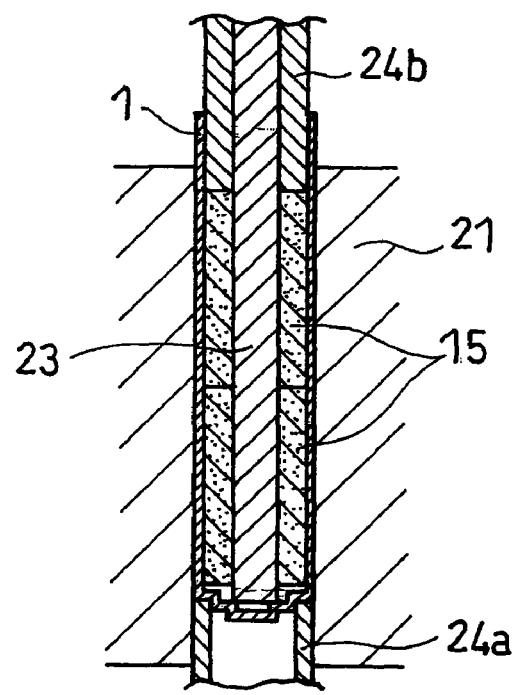
FIG. 4 is a schematic longitudinal sectional view showing an example of step (3) in a production method of an alkaline dry battery according to the invention.

Referring now to FIG. 4, an example of step (3) is described. FIG. 4 is a schematic longitudinal sectional view showing an example of step (3) in the production method of an alkaline dry battery of the invention.

As illustrated in FIG. 4, a lower molding punch 24a is inserted into the hollow of a hollow cylindrical cartridge 21. The cylindrical battery case 1 having a bottom and serving as the positive electrode terminal is disposed on the lower molding punch 24a in the hollow of the cartridge 21. Two positive electrode pellets 15 are inserted into the battery case 1. At this time, the two positive electrode pellets 15 are stacked coaxially, so that the hollows of the two positive electrode pellets communicate with each other. A cylindrical pin 23 having a diameter smaller than the internal diameter of the positive electrode pellets 15 by 0.2 to 0.5 mm is disposed in the hollows of the positive electrode pellets 15. With the pin 23 inserted in the hollow of a hollow cylindrical upper molding punch 24b, the positive electrode pellets 15 are pressed by the upper molding punch 24b from above at a pressure of 40 to 130 MPa per unit cross-sectional area of the positive electrode pellets 15 to compression mold the positive electrode pellets 15. The cross-sectional area as used herein refers to the area of a cross-section perpendicular to the axial direction of the positive electrode pellets 15. In this way, the hollow cylindrical positive electrode 2 closely adhering to the battery case 1 is obtained.

Since there is a gap of 0.2 to 0.5 mm between the pin 23 and the positive electrode pellets 15, the positive electrode pellets 15 deform toward the pin 23 so as to close the gap upon molding the positive electrode. At this time, low-density areas are formed in the positive electrode.

By changing the pressure applied to the positive electrode pellets upon the molding (pressure applied by the upper molding punch) and the dimension of the gap between the positive electrode pellets and the pin 23 in the aforementioned ranges, the state of the cracks formed in step (4) and the manganese dioxide density in the positive electrode can be controlled easily. The preferable gap between the pin 23 and the positive electrode pellets 15 is 0.3 to 0.4 mm. The preferable pressure applied by the upper molding punch 24b is 40 to 70 MPa.

(D) Step (4)

After a separator is disposed in the hollow of the positive electrode, an electrolyte is injected into the battery case. The electrolyte can be, for example, an aqueous solution of potassium hydroxide. When the electrolyte permeates the positive electrode, the positive electrode swells, and the swelling causes cracks to be formed.

(E) Step (5)

A negative electrode is filled into the hollow of the positive electrode with the separator interposed therebetween. The negative electrode can be, for example, a gelled negative electrode comprising a mixture of a gelling agent such as sodium polyacrylate, an alkaline electrolyte, and a negative electrode active material.

(F) Step (6)

The opening of the battery case is sealed with a seal assembly composed of a synthetic resin gasket, a bottom plate serving as the negative electrode terminal, and a negative electrode current collector. At this time, the negative electrode current collector is inserted into the gelled negative electrode. In the seal assembly, the body of the negative electrode current collector is inserted through the central through-hole of the gasket, and the head of the negative electrode current collector is welded to the bottom plate. The open edge of the battery case is crimped onto the circumference of the bottom plate with the gasket interposed therebetween, so as to seal the battery case.

In this way, the alkaline dry battery including the positive electrode having the cracks therein and having a manganese dioxide density of 2.15 to 2.30 g/cm$^3$ can be obtained.

Examples of the invention are hereinafter described in detail, but the invention is not to be construed as being limited to these Examples.

EXAMPLES 1 TO 12 AND COMPARATIVE EXAMPLES 1 TO 5

(1) Preparation of Positive Electrode Pellet

An electrolytic manganese dioxide powder (purity: 92%, mean particle size (D50): 45 μm) serving as a positive electrode active material, a graphite powder (mean particle size (D50): 40 μm) as a conductive material, and an aqueous solution containing 35% by weight of potassium hydroxide and 2% by weight of zinc oxide as an alkaline electrolyte were mixed in a weight ratio of 90:10:5. This mixture was evenly stirred and mixed with a mixer, and then shaped into granules of certain granule size. The granules were compression molded with a die as illustrated in FIG. 3, to obtain hollow cylindrical positive electrode pellets (external diameter: 13.23 mm, internal diameter: 9.17 mm, height: 22.10 mm, weight: 4.92 g, volume: 1.58 cm$^3$). The weight of manganese dioxide in each positive electrode pellet was found to be 3.88 g from the purity of the electrolytic manganese dioxide and the mixing ratio by weight, and the density of manganese dioxide in each positive electrode pellet was 2.46 g/cm$^3$.

(2) Production of Alkaline Dry Battery

Using the positive electrode pellets thus produced, AA-size alkaline dry batteries as illustrated in FIG. 1 were produced as follows.

Two positive electrode pellets 2 were inserted into a cylindrical battery case 1 with a bottom (external diameter: 13.8 mm, internal diameter: 13.45 mm, and height: 51.5 mm), made of a nickel plated steel plate and having a graphite coating film on the inner face. They were then compression molded inside the battery case 1 using a device as illustrated in FIG. 4, to obtain a positive electrode 2 closely adhering to the battery case 1.

A 0.25-mm thick separator 4 (which was prepared by rolling up a 0.125-mm thick non-woven fabric into two cylindrical layers) composed mainly of polyvinyl alcohol fibers and rayon fibers was fitted to the inner face of the positive electrode 2. Thereafter, an alkaline electrolyte was injected into the battery case 1.

After the injection, a gelled negative electrode 3 was filled into the separator 4. The gelled negative electrode 3 used was prepared by mixing a zinc powder (mean particle size: 150 μm) serving as a negative electrode active material, an aqueous solution containing 35% by weight of potassium hydroxide and 2% by weight of zinc oxide as an electrolyte, and sodium polyacrylate as a gelling agent in a weight ratio of 182:100:2.

A seal assembly 9 was fabricated by inserting the body of a negative electrode current collector 6 through the central through-hole of a gasket 5 and welding the head of the negative electrode current collector 6 to a bottom plate 7. The opening of the battery case 1 was sealed with the seal assembly 9. At this time, the negative electrode current collector 6 was inserted into the gelled negative electrode 3, and the open edge of the battery case 1 was crimped onto the circumference of the bottom plate 7 with the outer edge of the gasket 5 interposed therebetween. Subsequently, the outer surface of the battery case 1 was covered with a label 8. In this way, alkaline dry batteries were produced.

In the production of the alkaline dry batteries, as shown in Tables 1 and 2, the diameter of the pin (thus the difference between the diameter of the pin and the internal diameter of the positive electrode pellets) and the pressure applied to the positive electrode pellets to remold them inside the battery case were changed to obtain alkaline dry batteries having positive electrodes shown in Tables 3 and 4. It should be noted that the positive electrodes in Table 1 are the positive electrodes prepared by step (3), and that the positive electrodes in Table 3 are the positive electrodes prepared in step (4).

TABLE 1

| | Conditions of molding of positive electrode in battery case | | | Positive electrode | | | | |
|---|---|---|---|---|---|---|---|---|
| | Diameter of pin inserted (mm) | Difference between pin diameter and internal diameter of positive electrode pellet (mm) | Pressure applied (MPa) | External diameter (mm) | Internal diameter (mm) | Height (mm) | Volume (cm³) | Manganese dioxide density (g/cm³) |
| Example 1 | 8.97 | 0.2 | 130 | 13.45 | 8.97 | 41.30 | 3.26 | 2.38 |
| Example 2 | 8.87 | 0.3 | 130 | 13.45 | 8.87 | 41.20 | 3.31 | 2.35 |
| Example 3 | 8.77 | 0.4 | 130 | 13.45 | 8.77 | 41.00 | 3.35 | 2.32 |
| Example 4 | 8.67 | 0.5 | 130 | 13.45 | 8.67 | 40.80 | 3.39 | 2.29 |
| Example 5 | 8.67 | 0.5 | 100 | 13.45 | 8.67 | 41.10 | 3.41 | 2.27 |
| Example 6 | 8.67 | 0.5 | 70 | 13.45 | 8.67 | 41.40 | 3.44 | 2.26 |
| Example 7 | 8.67 | 0.5 | 40 | 13.45 | 8.67 | 41.60 | 3.45 | 2.25 |
| Example 8 | 8.87 | 0.3 | 40 | 13.45 | 8.87 | 41.20 | 3.31 | 2.35 |
| Example 9 | 8.97 | 0.2 | 40 | 13.45 | 8.97 | 41.40 | 3.27 | 2.38 |
| Example 10 | 8.97 | 0.2 | 100 | 13.45 | 8.97 | 41.10 | 3.24 | 2.39 |
| Example 11 | 8.87 | 0.3 | 100 | 13.45 | 8.87 | 41.55 | 3.34 | 2.33 |
| Example 12 | 8.77 | 0.4 | 70 | 13.45 | 8.77 | 41.55 | 3.39 | 2.29 |

TABLE 2

| | Conditions of molding of positive electrode in battery case | | | Positive electrode | | | | |
|---|---|---|---|---|---|---|---|---|
| | Diameter of pin inserted (mm) | Difference between pin diameter and internal diameter of positive electrode pellet (mm) | Pressure applied (MPa) | External diameter (mm) | Internal diameter (mm) | Height (mm) | Volume (cm³) | Manganese dioxide density (g/cm³) |
| Comparative Example 1 | 9.07 | 0.1 | 130 | 13.45 | 9.07 | 41.60 | 3.22 | 2.41 |

TABLE 2-continued

| | Conditions of molding of positive electrode in battery case | | | Positive electrode | | | | |
|---|---|---|---|---|---|---|---|---|
| | Diameter of pin inserted (mm) | Difference between pin diameter and internal diameter of positive electrode pellet (mm) | Pressure applied (MPa) | External diameter (mm) | Internal diameter (mm) | Height (mm) | Volume ($cm^3$) | Manganese dioxide density ($g/cm^3$) |
| Comparative Example 2 | 8.57 | 0.6 | 130 | 13.45 | 8.57 | 40.30 | 3.40 | 2.28 |
| Comparative Example 3 | 8.67 | 0.5 | 170 | 13.45 | 8.67 | 40.10 | 3.34 | 2.32 |
| Comparative Example 4 | 8.67 | 0.5 | 30 | 13.45 | 8.67 | 41.80 | 3.47 | 2.24 |
| Comparative Example 5 | 9.07 | 0.1 | 30 | 13.45 | 9.07 | 41.50 | 3.21 | 2.41 |
| Comparative Example 6 | 9.17 | 0 | 130 | 13.45 | 9.17 | 39.53 | 3.01 | 2.58 |
| Comparative Example 7 | 9.17 | 0 | 130 | 13.45 | 9.17 | 41.60 | 3.16 | 2.58 |

COMPARATIVE EXAMPLE 6

In step (2), the height and volume of the positive electrode pellets were changed to 21.00 mm and 1.50 $cm^3$, respectively, and the manganese dioxide density in the positive electrode pellets was changed to 2.59 $g/cm^3$. The molding conditions in step (3) were changed to those shown in Table 2. Except for these, in the same manner as in Example 1, a battery was produced.

COMPARATIVE EXAMPLE 7

In step (2), the positive electrode pellet weight was changed to 5.18 g, the electrolytic manganese dioxide amount was changed to 4.08 g, the positive electrode pellet volume was changed to 1.58 $cm^3$, and the manganese dioxide density in the positive electrode pellets was changed to 2.59 $g/cm^3$. The molding conditions in step (3) were changed to those shown in Table 2. Except for these, in the same manner as in Example 1, a battery was produced.

COMPARATIVE EXAMPLE 8

In step (2), the positive electrode pellet height was changed to 23.20 mm, the positive electrode pellet volume was changed to 1.66 $cm^3$, and the manganese dioxide density in the positive electrode pellets was changed to 2.34 $g/cm^3$. However, since the positive electrode pellets produced in these conditions did not have sufficient strength, they collapsed. Thus, a battery could not be produced.

[Evaluation]
(1) Examination of Positive Electrode in Battery

A radiograph of each of the batteries produced was taken to measure the external diameter, internal diameter, and height of the positive electrode, and the volume of the positive electrode was calculated. Also, after each battery was disassembled, the positive electrode containing the electrolyte was taken out of the battery, and the positive electrode was pulverized to a powder with particle sizes of 1 mm or less. It was then dried at 105° C. for 2 hours. From the weight difference before and after the drying, the water content in the positive electrode was calculated. Further, an aqueous solution was prepared by dissolving the positive electrode in concentrated hydrochloric acid, and the manganese (Mn) content in the aqueous solution was determined by ICP emission spectrometry. The content was then converted to the amount of $MnO_2$ to obtain the manganese dioxide content in the positive electrode.

(2) Battery Discharge Test

Each of the batteries produced was intermittently discharged in a constant temperature environment at 20° C.±2° C. Specifically, it was discharged at 250 mA for 1 hour every day, and the discharge time until the closed circuit voltage reached 0.9 V was obtained. The discharge time of each battery was expressed as an index (discharge performance index) relative to the discharge time of the battery of Comparative Example 6, which was defined as 100. A battery with a discharge performance index of higher than 110 was determined to be a high capacity battery.

The measurement results are shown in Tables 3 and 4.

TABLE 3

| | Positive electrode in battery | | | | | | Battery evaluation Discharge performance index |
|---|---|---|---|---|---|---|---|
| | External diameter (mm) | Internal diameter (mm) | Height (mm) | Water content (g) per gram of manganese dioxide | Volume ($cm^3$) | Manganese dioxide density ($g/cm^3$) | |
| Example 1 | 13.45 | 8.87 | 42.10 | 0.11 | 3.38 | 2.30 | 112 |
| Example 2 | 13.45 | 8.70 | 42.00 | 0.11 | 3.47 | 2.24 | 115 |
| Example 3 | 13.45 | 8.58 | 41.80 | 0.11 | 3.52 | 2.20 | 113 |

TABLE 3-continued

| | Positive electrode in battery | | | | | Battery evaluation Discharge performance index |
|---|---|---|---|---|---|---|
| | External diameter (mm) | Internal diameter (mm) | Height (mm) | Water content (g) per gram of manganese dioxide | Volume (cm$^3$) | Manganese dioxide density (g/cm$^3$) |
| Example 4 | 13.45 | 8.46 | 41.30 | 0.11 | 3.55 | 2.19 | 112 |
| Example 5 | 13.45 | 8.46 | 41.55 | 0.11 | 3.57 | 2.18 | 110 |
| Example 6 | 13.45 | 8.46 | 41.80 | 0.11 | 3.59 | 2.16 | 113 |
| Example 7 | 13.45 | 8.46 | 41.95 | 0.11 | 3.60 | 2.15 | 112 |
| Example 8 | 13.45 | 8.70 | 42.00 | 0.11 | 3.47 | 2.24 | 110 |
| Example 9 | 13.45 | 8.81 | 42.20 | 0.11 | 3.42 | 2.27 | 110 |
| Example 10 | 13.45 | 8.81 | 41.90 | 0.11 | 3.40 | 2.28 | 112 |
| Example 11 | 13.45 | 8.71 | 42.35 | 0.11 | 3.49 | 2.22 | 113 |
| Example 12 | 13.45 | 8.61 | 42.35 | 0.11 | 3.55 | 2.19 | 113 |

TABLE 4

| | Positive electrode in battery | | | | | Battery evaluation Discharge performance index |
|---|---|---|---|---|---|---|
| | External diameter (mm) | Internal diameter (mm) | Height (mm) | Water content (g) per gram of manganese dioxide | Volume (cm$^3$) | Manganese dioxide density (g/cm$^3$) |
| Comparative Example 1 | 13.45 | 8.96 | 42.20 | 0.11 | 3.33 | 2.33 | 103 |
| Comparative Example 2 | 13.45 | 8.34 | 40.70 | 0.11 | 3.56 | 2.18 | 87 |
| Comparative Example 3 | 13.45 | 8.46 | 40.65 | 0.11 | 3.50 | 2.22 | 85 |
| Comparative Example 4 | 13.45 | 8.46 | 42.15 | 0.11 | 3.62 | 2.14 | 103 |
| Comparative Example 5 | 13.45 | 8.92 | 42.30 | 0.11 | 3.37 | 2.31 | 104 |
| Comparative Example 6 | 13.45 | 9.07 | 40.33 | 0.11 | 3.12 | 2.48 | 100 |
| Comparative Example 7 | 13.45 | 9.07 | 42.40 | 0.11 | 3.28 | 2.49 | 118 |

In the batteries of Examples 1 to 12, since substantially arc-shaped cracks were formed in the positive electrode, the positive electrode volume was larger than that of the battery of Comparative Example 6 using the same amount of the positive electrode active material. As a result, the positive electrode reaction efficiency improved and a high capacity was obtained. It was confirmed that both high capacity and cost reduction were possible in the batteries of Examples 1 to 12.

In the case of the battery of Comparative Example 7, the positive electrode volume was increased by increasing the amount of the positive electrode active material, compared with the battery of Comparative Example 6. Hence, a high capacity was obtained but at high costs. As for the batteries of Comparative Examples 1, 4, and 5, since substantially arc-shaped cracks were not sufficiently formed in the positive electrode, the battery capacity was insufficient. As for the batteries of Comparative Examples 2 and 3, the cracks became too large, with some of the cracks extending around in the positive electrode so as to surround the negative electrode. As a result, the conductivity of the positive electrode became low and the battery capacity declined significantly.

The alkaline dry battery of the invention is inexpensive and has high performance. It is thus used advantageously as the power source for electronic devices, in particular, portable appliances.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. An alkaline dry battery comprising:
 a cylindrical battery case with a bottom;
 a cylindrical positive electrode having a hollow, being in contact with an inner face of the battery case, and containing a manganese dioxide powder and a graphite powder;
 a negative electrode disposed in the hollow of the positive electrode;
 a separator interposed between the positive electrode and the negative electrode; and
 an alkaline electrolyte,
 wherein the positive electrode has cracks therein,
 the cracks are substantially arc-shaped in a cross-section perpendicular to the axial direction of the positive electrode and extend in the axial direction of the positive electrode, and the positive electrode has a manganese dioxide density of 2.15 to 2.30 g/cm$^3$.

2. The alkaline dry battery in accordance with claim 1, wherein the manganese dioxide powder has a mean particle size (D50) of 45 to 75 μm.

3. The alkaline dry battery in accordance with claim 1, wherein the graphite powder has a mean particle size (D50) of 20 to 50 μm.

4. The alkaline dry battery in accordance with claim 1, wherein the positive electrode comprises a mixture of the manganese dioxide powder, the graphite powder, and the alkaline electrolyte.

5. The alkaline dry battery in accordance with claim 4, wherein the water content in the positive electrode is 10 to 12 parts by weight per 100 parts by weight of the manganese dioxide powder.

6. A method for producing an alkaline dry battery, comprising the steps of:
(1) mixing a manganese dioxide powder, a graphite powder, and an alkaline electrolyte, to form a positive electrode mixture;
(2) compression molding the positive electrode mixture to obtain cylindrical positive electrode pellets each having a hollow and having a manganese dioxide density of 2.4 to 2.5 g/cm$^3$;
(3) inserting the positive electrode pellets into a cylindrical battery case with a bottom, disposing a cylindrical pin which has a diameter smaller than the internal diameter of the positive electrode pellets by 0.2 to 0.5 mm in the hollows of the positive electrode pellets, and applying a pressure of 40 to 130 MPa to the positive electrode pellets from above, to obtain a positive electrode having a hollow and closely adhering to the battery case;
(4) disposing a separator in the hollow of the positive electrode, and injecting an alkaline electrolyte into the battery case to cause the positive electrode to have cracks therein that are substantially arc-shaped in a cross-section perpendicular to the axial direction of the positive electrode and extend in the axial direction of the positive electrode, so that the positive electrode has a manganese dioxide density of 2.15 to 2.30 g/cm$^3$;
(5) filling a negative electrode in the hollow of the positive electrode with the separator interposed therebetween; and
(6) sealing the battery case with a seal member.

7. The method for producing an alkaline dry battery in accordance with claim 6, wherein the content of the graphite powder in the positive electrode mixture is 10 to 15 parts by weight per 100 parts by weight of the total of the manganese dioxide powder and the graphite powder.

* * * * *